United States Patent [19]

Quella et al.

[11] Patent Number: 4,555,284

[45] Date of Patent: Nov. 26, 1985

[54] METHOD OF USING A FOAMABLE HOT-MELT ADHESIVE FOR SEALING

[75] Inventors: Ferdinand Quella, Gauting; Bernd Steinwender, Munich, both of Fed. Rep. of Germany

[73] Assignee: Siemens Aktiengesellschaft, Berlin & Munich, Fed. Rep. of Germany

[21] Appl. No.: 464,912

[22] Filed: Feb. 8, 1983

[30] Foreign Application Priority Data

Mar. 25, 1982 [DE] Fed. Rep. of Germany ....... 3211067

[51] Int. Cl.$^4$ .......................... B32B 31/14; B32B 5/20
[52] U.S. Cl. .......................... 156/79; 156/86; 156/94; 156/294; 174/110 F; 174/138 F; 174/DIG. 8; 264/36; 264/46.9; 427/140; 428/63; 428/317.5; 521/95
[58] Field of Search ...................... 156/78, 79, 48, 86, 156/294, 94; 264/45.9, 46.5, 36, 46.9; 521/79, 88, 90, 951; 524/562; 427/140; 174/110 F, 138 F, DIG. 8; 428/317.5, 63

[56] References Cited

U.S. PATENT DOCUMENTS

| | | | |
|---|---|---|---|
| 3,985,951 | 10/1976 | Harris | 156/79 X |
| 4,018,733 | 4/1977 | Lopez et al. | 260/27 EV |
| 4,129,531 | 12/1978 | Raver et al. | 521/94 |
| 4,243,568 | 1/1981 | Brown | 524/562 |
| 4,387,170 | 6/1983 | Kuhnel et al. | 521/88 X |

FOREIGN PATENT DOCUMENTS

2347799  4/1974  Fed. Rep. of Germany .

OTHER PUBLICATIONS

Dietrich Braun et al. "Untersuchung des Zerfalls verschiedener Azoinitiatoren in Lösung" (Investigation of the Decomposition of Various Azo-Initiators in Solution), Monatshefte für Chemie (Chemical Monthly) vol. 110, 1979, pp. 699–713.

*Primary Examiner*—Robert A. Dawson
*Attorney, Agent, or Firm*—Hill, Van Santen, Steadman & Simpson

[57] ABSTRACT

Foamable hot-melt adhesives comprised of a per se known hot-melt adhesive having a foaming additive therein, for example an organic azo compound. These adhesives can function in a purely physical foaming manner but can also function as crosslinking material, i.e. as solidifying and bonding materials. The foamable hot-melt adhesives of the invention can be used, for example, in sealing cable ends, for filling any desired aperture in the construction field, for sealing windows, doors, etc. or for sealing articles of manufacture.

8 Claims, No Drawings

METHOD OF USING A FOAMABLE HOT-MELT ADHESIVE FOR SEALING

BACKGROUND OF THE INVENTION

1. Field of the Invention

The invention relates to hot melt adhesives and somewhat more particularly to a method of producing foamable hot melt adhesives, the resultant product and the use thereof.

2. Prior Art

Hot melt adhesives are generally known and described, for example, in U.S. Pat. No. 4,018,733 (corresponding to German OS No. 2,347,799), which is incorporated herein by reference. A disadvantage of these hot-melt adhesives is that they cannot penetrate into relatively small apertures, cracks and the like. The prior art described in U.S. Pat. No. 4,018,733 generally comprises homopolymers or copolymers of, for example, polyethylene, polyamide and others, which in part also carry acidic or basic groups and also contain adhesion-promoting agents.

Properties exhibited by hot-melt adhesives and their chemical compositions generally always greatly depend on the environment of use. In principle, any desired thermoplastic can be utilized as a hot-melt adhesive. General information concerning hot-melt adhesives is available in the literature, for example Roempp, *Chemielexikon*.

SUMMARY OF THE INVENTION

The invention provides a foamable hot-melt adhesive which easily fills apertures, cracks, fissures and other like openings and which can be utilized for insulation or for seals.

In accordance with the principles of the invention, a foamable hot-melt adhesive is achieved by admixing a commercially available per se known hot melt adhesive granulate having a melting temperature in the range of about 100° C. (such as described in the earlier referenced U.S. Pat. No. 4,018,733) with a thermally decomposable foaming additive having an activation or decomposition temperature above the melting temperature of the adhesive, and heating the resultant admixture to a temperature above the melting temperature of the adhesive and below the activation temperature of the foaming additive to obtain a substantially uniform admixture. Upon use, this admixture is applied or positioned in the vicinity of a crack or the like and heated above the decomposition temperature of the additive so that foaming occurs and the resultant foam spreads into the crack, sealing the same and bonds to the surrounding surfaces.

In a preferred embodiment of the invention, a commercially available hot-melt adhesive granulate is selected so as to have a melting temperature of about 100° C. and the foaming additive is selected so as to have a decomposition temperature of about 170° C. and these two materials are admixed and heated up to approximately 150° C. to attain a uniform admixture prior to the application thereof.

The foamable hot-melt adhesive of the invention is advantageous in that it readily penetrates into substantially all size cavities and the like and fills them completely and this foamable hot-melt adhesive can be utilized for filling cracks or openings around articles of manufacture, portions of communication cable structures and in the construction field, such as in and around buildings or the like.

In certain preferred embodiments of the invention, the foaming additive comprises an organic azo compound having a decomposition temperature in the range of about 170° C. Preferred azo compounds useful in the practice of the invention are selected from the group consisting of azodicarbon amide; 1,1'-diacetoxy-1,1'-azocyclohexane; 2,2'-diacetoxy-2,2'-azopropane; 4,4'-dimethyl-4,4'-azobutyrolactone; 4,4'-dimethyl-1,4'-azobutyrolactone; 1,1'-dichloro-1,1'-diphenyl-1,1'-azoethane; 2,2'-dichloro-2,2'-azopropane; 1,1'-dichloro-1,1'-azocyclohexane; 1,1'-diacetoxy-1,1'-diphenyl-1,1'-azoethane; 2,2'-dipropionoxy-2,2'-azopropane; 2,2'-dicapronoxy-2,2'-azopropane; azoisobutyronitrile; 2-t-butylazo-2'-cyanobutan; and 2-t-butylazo-1'-cyanocyclohexane.

In certain other embodiments of the invention, the foaming additive comprises a peroxide compatible with polyolefins, such as a polyethylene, and having a useful halflife of about 10 hours, with an activation or decomposition temperature ranging from about 120° to 150° C. Exemplary peroxides useful in the practice of the invention comprise 2,5-dimethyl-2,5-di-(tertiary butyl peroxide)-hexane or dicumyl peroxide.

The foamable hot-melt adhesives of the invention are useful for insulating communication cable structure end portions, which may be provided with a filler piece, preferably composed of a plastic sealing material, having recesses for insertion of the cable end portions to be sealed. Further, the foamable hot-melt adhesives of the invention can be applied to a manufactured structure without a carrier element (such as a cable sleeve or tape) and can be directly pressed against a crack, such as for example, in a door panel, in a window, etc. and then heated so as to foam and fill the crack. Thus, the foamable hot-melt adhesives of the invention are suitable for filling any desired interstices found in the construction industry, in the electrical industry or in articles of manufacture. Of course, the foamable hot-melt adhesives of the invention can also be applied to a carrier element, such as a film and be used as such.

DESCRIPTION OF PREFERRED EMBODIMENTS

The invention provides a foamable hot-melt adhesive which is actived (foamed) at elevated temperatures (generally around 170° C.) and which is water-repellant and tacky toward most materials, such as plastics (for example polyolefins), wood, metal, glass, etc. utilized in various fields of use.

In accordance with the principles invention, a per se known hot-melt adhesive having a melting temperature in the range of about 100° C.; for example, comprised of a compatible mixture of (a) an acidic ethylene polymer having an acid number ranging from about 3 to about 80 and (b) a polyamide having an amine number ranging from about 70 to about 400, together with a minor effective amount (generally less than about 20% by weight per 100 parts of the acidic ethylene polymer and polyamide) of a tackifying agent (i.e. a polyketone resin), with the components (a) and (b) being present in a relative proportion by weight ranging from about 80:20 to 20:80, is admixed with a thermally decomposable foaming additive having a decomposition or activation temperature above the melting temperature of the adhesive and the resultant admixture is heated to a temperature between the adhesive melting temperature and the additive decomposition temperature so as to achieve a substantially uniform admixture. During use, this admixture may be reheated up to the adhesive melting temperature so as to liquefy the admixture and then applied, as by spreading, onto select surfaces containing cracks, fissures and the like. Thereafter, the so-applied mixture is heated at least to the decomposition temperature of the foaming additive so that a foaming occurs and the resultant foamed hot-melt adhesive spreads into the cracks, etc. to fill the same and bonds to the surrounding surfaces.

The foaming additives utilized in accordance with the principles of the invention can have a purely physical foaming effect on the hot-melt adhesive. However, as is usually the case with the organic azo compounds described earlier, the foaming additive can also have a cross-linking effect, i.e. have a solidifying effect on the hot-melt adhesive compounds. Further, the earlier described peroxides, effective over the same temperature range, can also be utilized as cross-linking aids. In all instances, the stability of the foamed adhesive material is increased and the water absorption thereof is reduced.

Telecommunication cables (electrical or optical communication cable structures having an outer jacket with at least one electrical or optical communication element in the interior thereof sealed against moisture or the like) necessarily have cable joints and cable ends which must be joined to one another and/or protected. Presently, cable ends or joints are covered with heat-shrinkable polyethylene film or are provided with matching end or filler pieces formed of a heat-shrinkable plastic, such as polyethylene, and have recesses therein for receiving of the cable ends. However, even when a slight overpressure occurs in a cable, as by gas expansion or the like, no moisture can be allowed to travel to an open cable connection. Therefore, interstices and the like between two or more cable ends or joints are filled out, for example, with a filling or lining piece formed in the approximate shape of the interstices. These filler pieces are, for example, also formed of polyethylene. However, gaps which do not tightly seal, even after shrinkage of the cable jacket, occur between the filler piece and the cable or cable jacket.

It has been proposed to coat these type of filler pieces with a hot-melt adhesive so that these gaps can be sealed since the hot-melt adhesive liquifies during the hot shrinkage operation and bonds the surfaces forming the gaps. However, a disadvantage of this proposal is that larger interstices, as occur, for example, due to inhomogenities of a cable jacket or even over a curve of a cable structure, cannot be covered up or filled-up.

By utilizing the foamable hot-melt adhesive of the invention, the above disadvantages can be eliminated. In this connection, the foamable hot-melt adhesive is so formulated that it exhibits at least the following properties; it foams during the shrinkage operation and thereby fills in any gaps or the like and it can not foam too greatly since otherwise the foam could force-out a filler piece which may be present, particularly at cable ends, out of a cable connection or joint.

Typical shrinkage temperatures used on cable structures (having a heat-shrinkable plastic jacket or the like), with an open flame amounts to about 170° C. and higher. Commercially available hot-melt adhesives, such as described earlier, typically begin to melt at approximately 100° C. In this environment of use, a foamable additive which is activated or decomposes at an approximate range of about 170° C. is required in a foamable hot-melt adhesive applied to a heat-shrinkable plastic-containing cable structure so as to foam the applied adhesive. Suitable foaming additives for this foaming temperature range are organic azo compounds (which may be symmetrical or non-symmetrical) of the type:

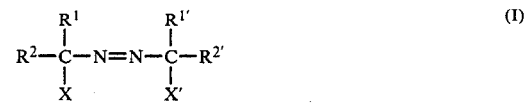

wherein $R^1$, $R^2$, $R^{1'}$, and $R^{2'}$ are alkyl or aryl substituted radicals and X and X' are a halogen, an acetate, a nitril and the like. Preferred organic azo compounds are selected from the group consisting of azodicarbon amide; 1,1'-diacetoxy-1,1'-azocyclohexane; 2,2'-diacetoxy-2,2'-azopropane; 4,4'-dimethyl-4,4'-azobutyrolactone; 4,4'-dimethyl-1,4'-azobutyrolactone; 1,1'-dichloro-1,1'-diphenyl-1,1'-azoethane; 2,2'-dichloro-2,2'-azopropane; 1,1'-dichloro-1,1'-azocyclohexane; 1,1'-diacetoxy-1,1'-diphenyl-1,1'-azoethane; 2,2'-dipropionoxy-2,2'-azopropane; 2,2'-dicapronoxy-2,2'-azopropane; azoisobutyronitrile; 2-t-butylazo-2'-cyanobutan; and 2-t-butylazo-1'-cyanocyclohexane.

These azo compounds, as well as suitable other azo compounds which decompose or are activated at relatively high temperatures are described by D. Braun et al "Untersuchung des Zerfalls verschiedener Azoinitiatoren in Lösung" ("Investigation of the Decomposition of Various Azo-Initiators in Solution"), Monatshefte für Chemie (Chemical Monthly), Vol. 110, (1979) pages 699–713.

The addition and application or coating of foamable hot-melt adhesives containing an organic azo compound occurs, for example as follows: an amount in the range of about 0.5 to 10% by weight (based on the weight of the hot-melt adhesive) of a granular azo compound is added to a commercially available hot-melt adhesive powder having a melting temperature of approximately 100° C. and the mixture is then heated to temperature below the decomposition temperature of the foaming additive, for example, to approximately 150° C., with stirring. During this step, the azo compound hardly foams at all and a substantially homogeneous admixture results.

If desired, this liquified admixture, at this relatively elevated temperature, can be applied as a thin film or coating with the aid of a heated jet (a Bunsen burner or the like) on a cable filler piece or to the inner surface of a cable jacket. Good foaming results can be obtained with a concentration of approximately 3% by weight of a foaming additive. After application, the coated workpiece can be heated to a temperature of about 170° C. so that foaming occur and any cavities of the like are filled with the foam and adjoining surfaces are bonded to one another via the adhesive.

If desired, the admixed foamable hot-melt adhesive can be cooled and stored for later use or be applied in its heated, but unfoamed state, onto a carrier, such as a heat-shrinkable plastic film and then cooled and stored for later use.

The amount of foaming additive utilized in an individual instance depends upon how long the elevated temperature is to be effective (i.e. how long the environment, such as a cable jacket, a door panel, etc. can withstand the activation or foaming temperature); how far the source of heat is removed from the foaming location; and the degree of thermoconductivity of the material to which the foamable hot-melt adhesive is applied. An advantage attainable by practicing the principles of the invention consist in filling in all cavities in the vicinity of the applied surfaces.

The practice of the invention is not limited to applications in the telecommunication cable field. Sealing cavities is a particularly bothersome problem in the domestic and commercial construction field. In this field, hollow cavities are frequently foamed-out with polyurethanes. However, problems exist with smaller cracks and the like, which cannot be adequately sealed with this technique.

With the practice of the invention in this area, films can be coated on a surface thereof with a foamable hot-melt adhesive. These films can then be pressed against surfaces containing cracks or the like and be attached so as to bond to such surfaces to seal the cracks therein with a controlled flame, as from a commercial gas (propane burner).

The foamable hot-melt adhesives of the invention can also be utilized to seal articles of manufacture.

The foaming properties of the foamable hot-melt adhesives produced in accordance with the principles of the invention depend, at least in part, on two factors:

1. the softening or melting temperature of the hot-melt adhesive; for example, an adhesive comprised of polyethylene/polyvinyl acetate copolymer liquifies at approximately 100° C. Foaming can occur at approximately 50° to 70° higher than the adhesive melting temperature. While foaming can also occur at even greater temperatures, the material becomes too fluid and gas bubbles escape, destroying the integrity of the foam. In general, thermoplastic hot-melt adhesives having a melting temperature of about 70° to 120° C. are preferred for formulating the foamable hot-melt adhesives of the invention.

2. the foaming behavior also depends on the decomposition properties of the foaming additive utilized. Generally, all the azo compounds ennumerated in the Braun et al publication (earlier referenced) are suitable for use, along with peroxides activated in the same approximate temperature range.

The foaming behavior of all such additives is generally governed by the relation:

$$dI/dt = k \cdot I$$

wherein dI is the decomposed amount of foaming additive per unit time; dt is a unit of time; k is the decomposition rate constant and I is the initial concentration of foaming additive in the foamable hot-melt adhesive.

The decomposition rate constant, in turn, depends on the temperature applied in accordance with the relation:

$$k = k_o \cdot \frac{E_A}{RT}$$

wherein k is the decomposition rate constant at a temperature T (with the decomposition rate constant being defined by a logarithmic entry of $k_o/(1/T)$ with $k_o$ being the abscissa of a x-y coordinate system); $E_A$ is the activation energy of the decomposition reaction; R is the gas constant and T is the decomposition temperature in degrees Kelvin.

The foaming reaction begins when a noticeable portion of an additive has decomposed, with a simultaneous softening or liquification of the hot-melt adhesive. Accordingly, the concentration of the foaming additive in the foamable admixture, the temperature applied to this foamable admixture and the decomposition rate of a given additive as well as the foaming time must be taken into consideration in each instance.

A foaming additive decomposing at a relatively high temperature is, therefore, added in a relatively low concentration while an additive decomposing at a relatively low temperature is added in a higher concentration. With a known foaming temperature, one first calculates the decomposition rate constant, k, at the decomposition temperature, for example 170° C. This constant is plugged in the relation $dI/dt = k \cdot I$ wherein dt is approximately delta t (foaming time in a connection of a cable structure), which in the present case is about 5 minutes. The amount of decomposed foaming additive is calculated therefrom in mols (dI approximately equals delta I). The volume of the foam can be calculated on the basis of the universal gas laws with the relation:

$$p \cdot V = n \cdot R \cdot T$$

wherein p is 1 atmosphere pressure; V is the foam volume sought; R is the gas constant; T is the foaming temperature and n is the mol number of decomposed foam additive. Typically, the number of mols must be multiplied by a factor of 3 in the case of the decomposition products. Thus, one mol of $N_2$ and 2 mols of organic decomposition products generally are generated per mol of decomposed foam additive.

The foaming properties can be empirically determined. The foaming time and temperature in a given instance can be roughly defined when foaming with an open flame, such as from a Bunsen burner or a propane gas burner. Of course, a more precisely controllable heat source can also be utilized. The heat source is shut-off when sufficient foaming occurs. In the construction field, an open flame should be avoided or used with extreme care because numerous combustible decomposition products may be generated and present a danger to the personnel and or structures involved.

As is apparent from the foregoing specification, the present invention is susceptible of being embodied with various alterations and modifications which may differ particularly from those that have been described in the preceeding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

We claim as our invention:

1. A method of producing a foamable hot-melt adhesive, comprising:
   admixing a per se known granulated hot-melt thermoplastic adhesive having a melting temperature in the range of about 100° C. with a thermally decomposable powdered foaming additive having a decomposition temperature above the melting temperature of said adhesive; said foaming additive being selected from the group consisting of 1,1'-diacetoxy-1,1'-azocyclohexane; 2,2'-diacetoxy-2,2'-azopropane; and 4,4'-dimethyl-4,4'-azobutyrolactone; and heating the resultant admixture to a temperature above the melting temperature of said adhesive and below the decomposition temperature of said foaming additive so as to provide a molten adhesive together with a foaming additive therein which evidences substantially no foaming at said temperature to achieve a substantially uniform admixture.

2. A method of sealing communication cable structure ends comprising:
coating a foamable hot-melt adhesive, comprised of substantially uniform admixture of a per se known molten thermoplastic adhesive having a melting temperature in the range of about 100° C. and a thermally decomposable solid foaming additive in said molten adhesive having a decomposition temperature above the melting range of said adhesive, onto end portion to be sealed; said foaming additive being selected from the group consisting of 1,1'-diacetoxy-1,1'-azocyclohexane; 2,2'-diacetoxy-2,2'-azopropane; and 4,4'-dimethyl-4,4'-azobutyrolactone; and
heating the so-coated end portions to a temperature above the decomposition temperature of said foaming additive so that a foam is generated on said end portions and, which bonds and seals said end portions.

3. A method for joining cable structure ends wherein a filler piece composed of a heat-shrinkable plastic material and having recesses for insertion of cable structure end portions is coated with a foamable hot-melt adhesive composed of a substantially uniform admixture of a thermoplastic adhesive having a melting temperature of about 100° C. and a thermally decomposable foaming additive having a decomposition temperature above the melting temperature of said adhesive, said foaming additive being selected from the group consisting of 1,1'-diacetoxy-1,1'-azocyclohexane; 2,2'-diacetoxy-2,2'-azopropane; and 4,4'-dimethyl-4,4'-azobutyrolactone, said cable end portions are inserted into said filler piece and in contact with said foamable hot-melt adhesive in the molten state, and the resultant assembly is heated to a temperature sufficient to shrink said filler piece about said cable ends and to decompose said foaming additive so that a foam is generated between said end portions and filler piece and which bonds and seals said end portions with said filler piece.

4. A foamable hot-melt adhesive comprising:
a substantially uniform admixture of a per se known thermoplastic adhesive having a melting temperature in the range of about 70° to 120° C. and a thermally decomposable foaming additive having a decomposition temperature above the melting range of said adhesive, said foaming additive being selected from the group consisting of 1,1'-diacetoxy-1,1'-azocyclohexane; 2,2'-diacetoxy-2,2'-azopropane; and 4,4'-dimethyl-4,4'-azobutyrolactone.

5. A foamable hot-melt adhesive as defined in claim 4 wherein the amount of foaming additive in the admixture is in the range of about 0.5 to 10% by weight, based upon the weight of said hot melt adhesive.

6. A foamable hot-melt adhesive as defined in claim 4 wherein said foamable hot-melt adhesive is positioned on a heat-shrinkable plastic film.

7. A film structure comprising a carrier sheet having two opposing major surfaces, and a foamable hot-melt adhesive comprised of a substantially uniform admixture of a per se known thermoplastic hot-melt adhesive having a melting range of about 100° C. and a thermally decomposable foaming additive having a decomposition temperature above the melting range of said adhesive, said foamable hot-melt adhesive being positioned on at least one of said major surfaces of said carrier sheet, said foaming additive being selected from the group consisting of 1,1'-diacetoxy-1,1'-azocyclohexane; 2,2'-diacetoxy-2,2'-azopropane; and 4,4'-dimethyl-4,4'-azobutyrolactone.

8. A method of filling apertures and the like in the construction field, comprising:
applying a foamable hot-melt adhesive comprised of a substantially uniform admixture of a per se known molten thermoplastic adhesive having a melting range of about 100° C. and a thermally decomposable solid foaming additive having a decomposition temperature above the melting range of said adhesive on surfaces containing an aperture to be sealed; said foaming additive being selected from the group consisting of 1,1'-diacetoxy-1,1'-azocyclohexane; 2,2'-diacetoxy-2,2'-azopropane; and 4,4'-dimethyl-4,4'-azobutyrolactone; and
heating the so-applied foamable hot-melt adhesive to a temperature above the decomposition temperature of said forming additive so that the foam is generated which fills the aperture and bonds to surrounding surfaces.

* * * * *